US012611821B2

(12) United States Patent
Žďárský et al.

(10) Patent No.: US 12,611,821 B2
(45) Date of Patent: Apr. 28, 2026

(54) METHOD FOR PRODUCING A CONNECTION BETWEEN A FIRST PLASTIC COMPONENT AND A SECOND PLASTIC COMPONENT AND COMPONENT CONNECTION PRODUCED THEREBY

(71) Applicant: Magna Exteriors (Bohemia) s.r.o., Liberec (CZ)

(72) Inventors: Radim Žďárský, Liberec (CZ); Ondřej Vohlídal, Liberec (CZ); Jan Soltys, Liberec (CZ)

(73) Assignee: Magna Exteriors (Bohemia) s.r.o., Liberec (CZ)

( * ) Notice: Subject to any disclaimer, the term of this patent is extended or adjusted under 35 U.S.C. 154(b) by 239 days.

(21) Appl. No.: 18/117,495

(22) Filed: Mar. 6, 2023

(65) Prior Publication Data

US 2023/0302743 A1 Sep. 28, 2023

(30) Foreign Application Priority Data

Mar. 23, 2022 (DE) .......................... 102022202854.6

(51) Int. Cl.
B29C 65/00 (2006.01)
B29C 65/08 (2006.01)
(52) U.S. Cl.
CPC ........ B29C 66/30223 (2013.01); B29C 65/08 (2013.01); B29C 66/21 (2013.01)
(58) Field of Classification Search
CPC ....... B29C 65/08; B29C 66/21; B29C 66/345; B29C 66/30223; B29C 66/30221; B29L 2031/3044; B60R 19/02
See application file for complete search history.

(56) References Cited

U.S. PATENT DOCUMENTS

| | | | |
|---|---|---|---|
| 4,618,516 A | 10/1986 | Sager | |
| 4,713,419 A * | 12/1987 | Takimoto .............. | C08L 23/142 |
| | | | 428/31 |
| 4,997,720 A * | 3/1991 | Bourbonais ............. | C08L 23/16 |
| | | | 524/508 |
| 2005/0104389 A1* | 5/2005 | Vadot .................. | B29C 66/8432 |
| | | | 293/117 |

(Continued)

FOREIGN PATENT DOCUMENTS

| | | |
|---|---|---|
| CN | 1113466 A | 12/1995 |
| CN | 113103597 A | 7/2021 |

(Continued)

OTHER PUBLICATIONS

CN Search Report; Appl No. 202310276634.9; 2025062601025730; Jun. 26, 2025; 9 pages.

(Continued)

*Primary Examiner* — Carson Gross
(74) *Attorney, Agent, or Firm* — Dickinson Wright PLLC

(57) ABSTRACT

The invention relates to a method for producing a connection between a first plastic component and a second plastic component, wherein at least one of the two components is produced by plastics injection moulding, wherein at least one fastening region is provided on the at least one component and is moulded with a surface structure of grooves having a small spacing, and wherein the components are connected to one another by an ultrasonic welding method in the fastening region.

13 Claims, 3 Drawing Sheets

(56)               References Cited

U.S. PATENT DOCUMENTS

| | | | |
|---|---|---|---|
| 2019/0194439 A1 * | 6/2019 | Kim | C08L 23/16 |
| 2020/0016843 A1 * | 1/2020 | Mayer | B29C 66/472 |

FOREIGN PATENT DOCUMENTS

| | | | | |
|---|---|---|---|---|
| DE | 102007034412 A1 * | 1/2009 | | B29C 65/08 |
| DE | 102012221605 A1 | 5/2014 | | |
| DE | 102020200184 A1 | 7/2021 | | |
| EP | 3848185 A1 | 7/2021 | | |
| JP | H02312101 A | 12/1990 | | |
| JP | 2016010883 A * | 1/2016 | | |
| WO | 2018172385 A1 | 9/2018 | | |

OTHER PUBLICATIONS

Branson; Ultrasonic Plastic Joining; Part Design for Ultrasonic Welding; Emerson Industrial Automation; 12 pages; Apr. 2012.
Search Report; EP 23160672.4; Mar. 12, 2024; 4 pages.

* cited by examiner

6

7

9

11

10

S1     S2     S3     S4     S5

METHOD FOR PRODUCING A CONNECTION BETWEEN A FIRST PLASTIC COMPONENT AND A SECOND PLASTIC COMPONENT AND COMPONENT CONNECTION PRODUCED THEREBY

CROSS-REFERENCE TO RELATED APPLICATIONS

This application claims priority to German Application No. DE 102022202854.6 filed on Mar. 23, 2022. The entire disclosure of the above application is incorporated herein by reference.

FIELD OF THE INVENTION

The invention relates to a method for producing a connection between a first plastic component and a second plastic component.

The invention furthermore relates to a component connection which is produced by the method.

BACKGROUND OF THE INVENTION

This section provides information related to the present disclosure which is not necessarily prior art.

Bumpers are increasingly being produced with receptacles for ultrasonic sensors for parking aids, parking assistants and radar sensors.

DE 10 2007 034 412 A1 relates to a device, intended for a motor vehicle, for monitoring a distance of the vehicle from an object by means of a distance measuring sensor, configured in particular as an ultrasonic sensor, which has a holder that receives the sensor and can be fixed by means of a bearing surface in a bodywork region of the motor vehicle, in particular on a plastic part, for example a bumper. An ultrasonic welding method for fixing the device as well as a plastic bodywork component and a sensor that can be fixed on the latter are furthermore disclosed.

This device is already widely used under the name "Park Pilot" or "Park Distance Control". In this known system, distance sensors installed in the front or rear bumper detect possible objects lying behind the vehicle by means of ultrasound pulses according to the echo sounding principle. The sensor signals are evaluated in an evaluation and control instrument, which calculates the range of the closest detected object. As soon as the calculation reveals that an obstacle is less than for example 1.2 m away from the vehicle, a warning signal is given to the vehicle driver in the form of an intermittent acoustic signal. The pause between individual pulses of the warning signal decreases as the obstacle is approached, until the warning signal becomes a continuous tone at a range of 30 cm. At the same time, the range may be indicated visually on a multicolour display which is fitted in the rear of the vehicle.

Since the holders need to be installed as variants of the large-area component, that is to say the bumper, they are not simultaneously co-moulded but are welded to the large-area basic component as required.

Furthermore, it is also known to fasten the holders on the bodywork by means of an ultrasonic welding method. For this purpose, the corresponding faces of the bearing surface and of the bodywork region are configured smoothly so as to make the contact face as large as possible. A disadvantage encountered in this case, however, is that impairment of the visual appearance may occur on the visible side of the bodywork region because of the energy input during the melting of the contact face.

EP 3 848 185 A1 relates to a method for the ultrasonic welding of two plastic components by using a sonotrode, the energy for the welding being introduced into the plastic components via at least two pins of the sonotrode, the two plastic components being spot-welded to one another step-by-step, the next respective welding step is carried out in a region which has already been stressed by a previous step of the welding and relaxed again.

The sound is coupled in through the at least two protruding elevations, or pins. This ensures accurately positioned sound input coupling, which is substantially independent of possibly existing component tolerances or positioning inaccuracies. Undesired weld terminations in edge regions of the sonotrode and/or of the component or workpiece may thus be avoided.

During the welding process, the sonotrode is placed onto the workpiece in such a way that a central longitudinal axis of the sonotrode extends perpendicularly to the surface of the workpiece. The sound input coupling therefore takes place perpendicularly into the workpiece, that is to say the components to be welded, in the direction of the central longitudinal axis of the sonotrode.

U.S. Pat. No. 2,005,104 389 A1 presents the assembling of a trim part made of thermoplastic material for a motor vehicle with another part, which has a thin portion made of thermoplastic material, the thin portion having openings and the melting of the trim part together with the thin portion being localised exclusively on the outlines of the through-openings.

DE 10 2012 221 605 A1 relates to a method for connecting two components, or a component composite, wherein the second component used is an already prefabricated, that is to say solid plastic component, which is connected to the first component in the connecting region by melting or liquefying the plastic material on the side facing towards the first component. By the melting or liquefying of the plastic material of the second component, intimate connection or engagement of the plastic of the second component with the surface structure of the first component takes place, so that a reliable and firm connection of the two components is formed after the (re)solidification of the plastic. One of the component surfaces is in this case structured.

WO 2018/172 385 A1 presents a method for connecting a first object to a second object, wherein one of the objects has a particular density profile. Ribs constitute anchoring points of the two objects, the two objects having very different densities.

SUMMARY OF THE INVENTION

This section provides a general summary of the disclosure and is not a comprehensive disclosure of its full scope or all of its features.

It is an object of the invention to provide an optimised production method which leads to a high-strength connection.

The object is achieved by a method for producing a connection between a first plastic component and a second plastic component, wherein at least one of the two components is produced by plastics injection moulding, wherein at least one fastening region is provided on the at least one component and is moulded with a surface structure of grooves having a small spacing, and wherein the components are connected to one another by an ultrasonic welding method in the fastening region.

The surface structure greatly improves the strength after the welding.

The grooves are produced at least partially parallel to one another in the fastening region of the at least one component.

The grooves are produced in the fastening region of the at least one component with a groove apex to groove apex spacing of from 0.1 to 2 mm.

The grooves are produced in the fastening region of the at least one component with a depth between the groove apex and the groove base of from 0.1 to 2 mm.

The grooves form squares, rectangles or hexagons that are produced with an extent of from 0.2 to 3 mm and a depth of from 0.1 to 1.5 mm.

It is advantageous that the energy for the welding is introduced into the plastic components via at least one pin of a sonotrode, the two components being spot-welded to one another step-by-step.

In this case, the next respective welding step is carried out in a region which has already been stressed by the previous step of the welding and relaxed again.

The components are bumpers and holders for sensors, reinforcing parts and other parts having a relatively thin wall thickness.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
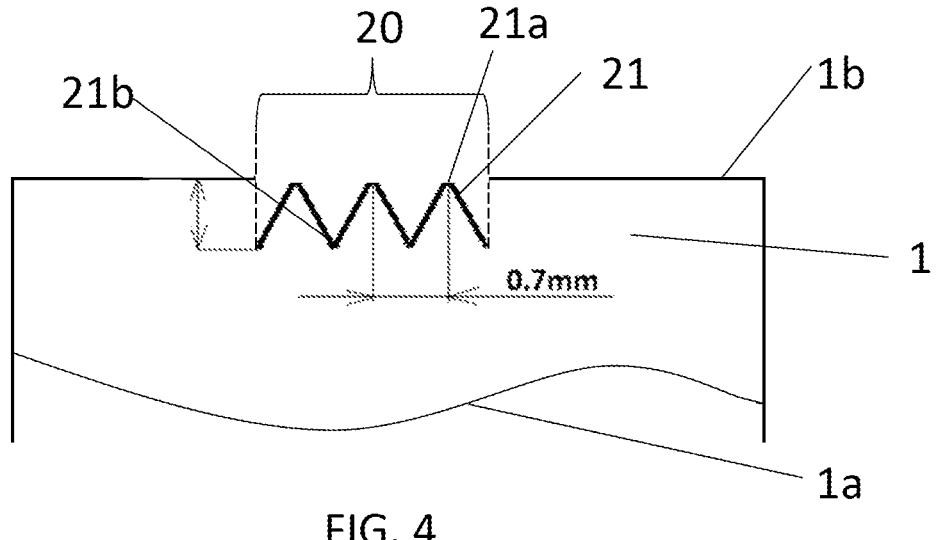

FIG. 4. shows a surface structure.

Figure 5A:
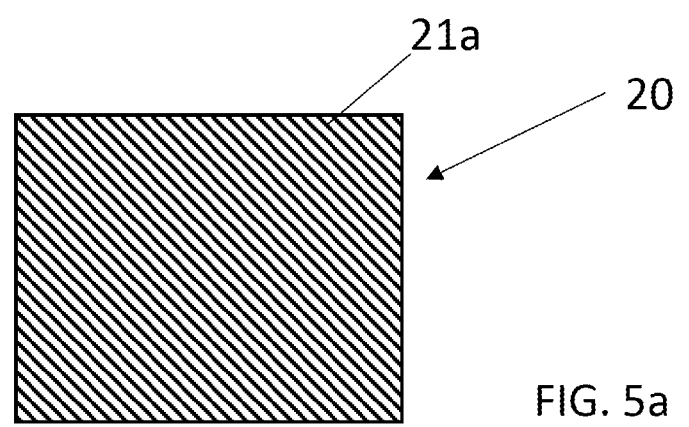
Figure 5B:
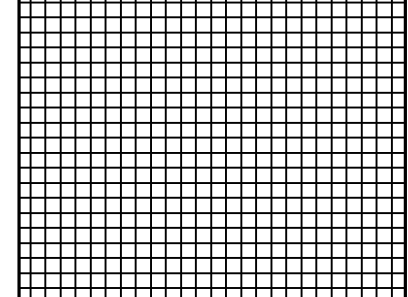
Figure 5C:
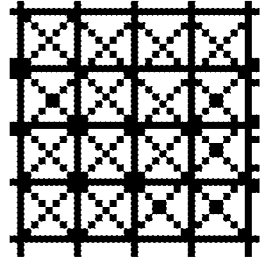

FIGS. 5*a*, 5*b* and 5*c* each show a plan view of surfaces of a component.

DESCRIPTION OF THE INVENTION

Figure 1:
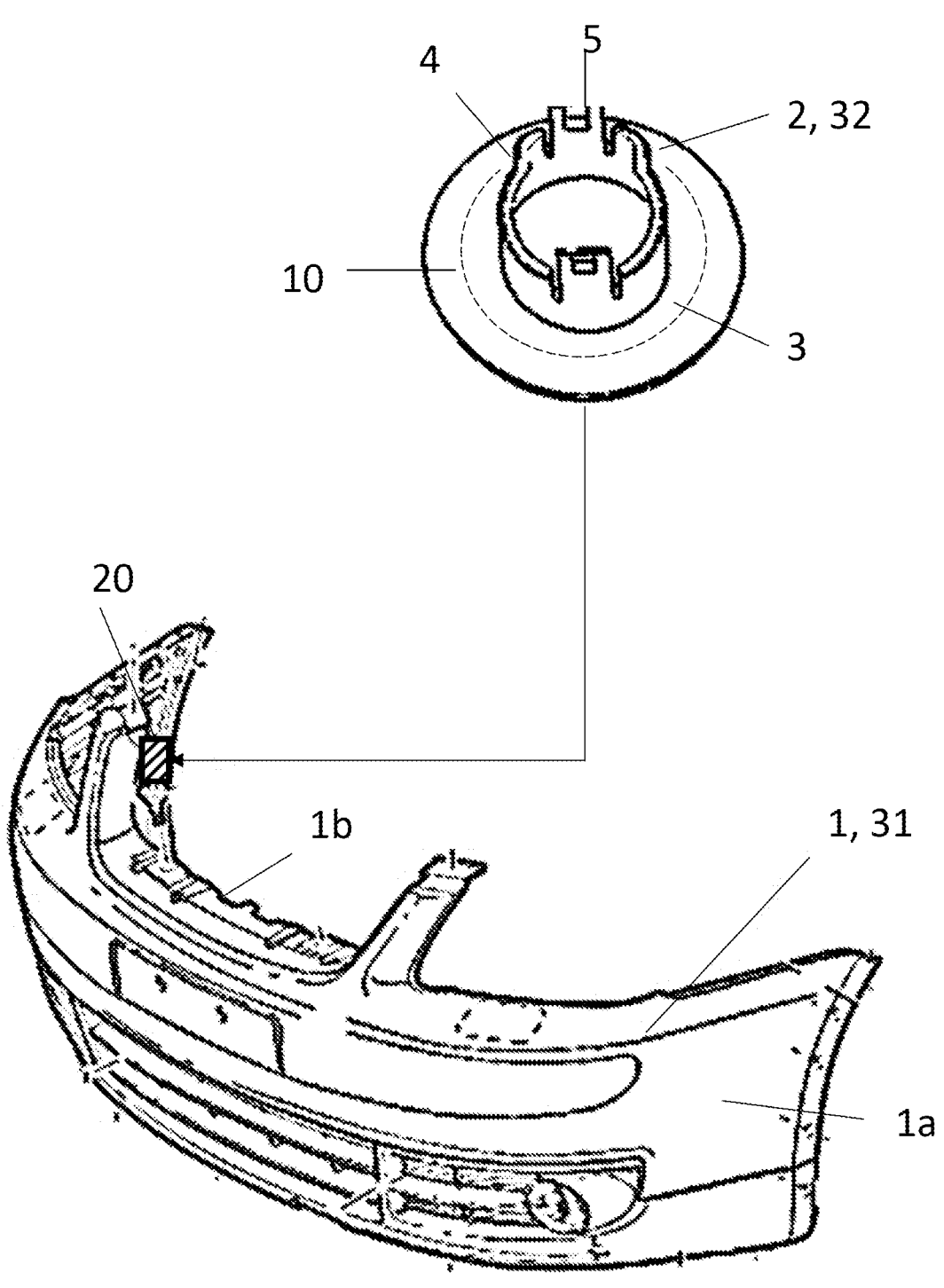
FIG. 1 shows a schematic representation of a bumper at the front.

FIG. 1 shows an exemplary embodiment of an exemplary bumper 1, such as is used on the front of a vehicle. The bumper 1 in this case constitutes a first plastic component 31. The latter may however also be a sill, a boot door, a wheel arch trim or another plastic part in the exterior region of the vehicle.

On a side 1*b* of the bumper 1 facing towards the vehicle, holders 2 for various sensors, for example, are fastened. Reinforcing parts, spoilers, etc, may however also be connected as a second component 32 to the first component 31. The holder 2 represented by way of example in this case has an annular bearing surface 3 and a cylindrical receptacle 4. A sensor is inserted into the receptacle 4 and is retained by means of the connectors 5 fitted on the receptacle 4 using a clip connection or a bayonet connection. An outwardly facing surface 1*a* of the bumper 1 must not show visible traces of the holder or holders 2, and must impart a perfect paint appearance.

The bearing surface 3 of the holder 2 may, in this case, naturally also be configured to be square or rectangular, as well as asymmetrical, in order to ensure accurate positioning definition of the holder 2 on the bumper 1. A possible welding path 10 is indicated as a circular path.

On the inner side 1*b* of the bumper 1, a fastening region 20 for the holder 2 is shown, which in this example is selected to be rectangular.

A cross section through the fastening region 20 of the bumper 1 is shown by FIG. 4. The surface of the bumper 1 is formed with a groove structure, which is also shown in plan view in FIG. 5*a*. The grooves 21 are applied with their depth only on the surface of the bumper 1, which has a substantially larger thickness of up to 15 mm.

The grooves have a spacing of less than one millimetre, this being a spacing of 0.7 mm from one groove apex 21*a* to the next groove apex 21*a* in the exemplary embodiment. The depth of the grooves from the groove apex 21*a* to the groove base 21*b* is for example 0.6 mm. The range for the spacing of the groove apexes is set between 0.1 and 2 mm, and the groove depth at 0.1-2 mm. In this range, an optimal strength is imparted to the desired connection.

The grooves 21, as shown in FIG. 5*a*, are arranged linearly and parallel to one another in one embodiment. FIG. 5*b* shows an arrangement in a chequerboard pattern, in which the groove apexes 21*a* form squares or rectangles or a hexagonal structure. In this case, however, the small spacing between the groove apexes 21*a* and the depth from the groove base 21*b* are preserved.

One exemplary embodiment uses 1×1 mm large squares having a depth of 0.2 mm and a spacing of 1.5 mm of the groove apexes from one another. The optimal range is a configuration of 0.2 to 3 mm spacings and a depth of from 0.2 to 3 mm.

FIG. 5*c* represents a surface structure which forms small pyramids based on a square or rectangle. A cone structure based on circles and ellipses is also possible. The height of the pyramids or cones is in this case between 0.1 and 2 mm, and the spacings are from 0.1 to 2 mm. The cones may also be configured as truncated cones.

During the production of the connection between the bumper 1 and the holder 2, that is to say a first plastic component 31 and a second plastic component 32, the first and second plastic components are produced by plastics injection moulding. The first component 31 or the second component 32, or both components, have one or more fastening regions 20. These are produced with the overall shape of the components during the plastics injection moulding.

The materials used in this case are for example PP, PP with talc, PP with glass fibres, ABS, PC with ABS and ASA.

In the next step, the components 31, 32 are connected to one another with a form-fit, the fastening regions 20 being used as bonding surfaces.

Ultrasonic welding methods may be used as the welding methods. For example, the welding method known from DE 10 2020 200 184 A1 is used.

Figure 2:
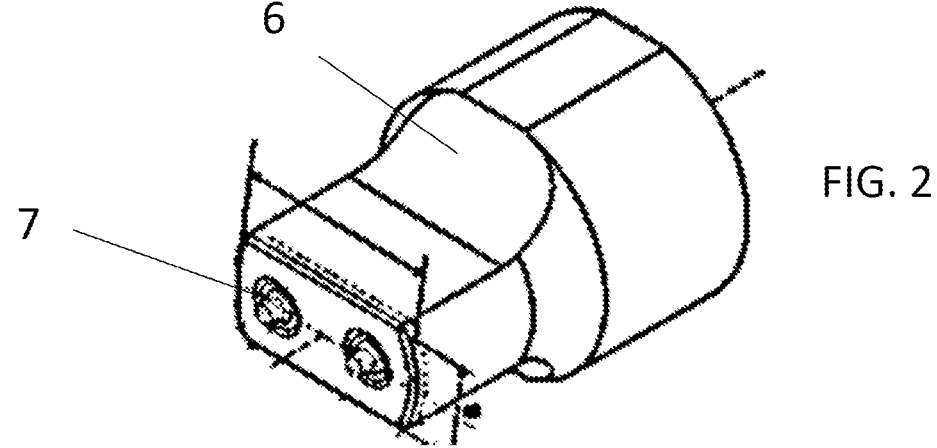
FIG. 2 shows a sonotrode in the prior art.

The method uses ultrasonic welding employing a sonotrode 6, which is represented by way of example in FIG. 2. The sonotrode 6 in this exemplary embodiment has two pins 7. By means of such a sonotrode 6, the holder 2 is spot-welded to the bumper 1 at the two pins 7.

The welding process is in this case carried out step-by-step by means of moving the sonotrode 6 along the bearing surface 3 of the holder 2, which bears on the fastening region 20. In the example of FIG. 1, the sonotrode moves along a circular line in the region of the annular bearing surface 3.

Figure 3:
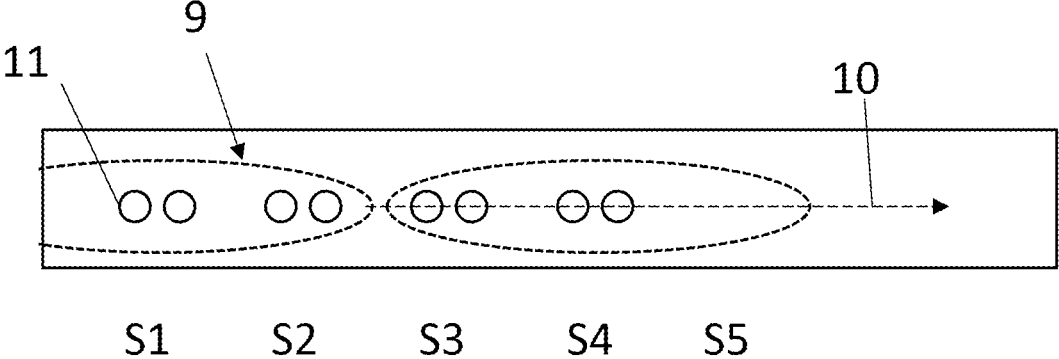
FIG. 3 shows an exemplary welding path.

FIG. 3 represents a linear welding path. The welding spots 11 are placed pairwise by employing the sonotrode with two pins. After the welding step S1, the welding step S2 is carried out, etc. A region of the energy influence 9 is denoted for the welding step S1, and likewise in the welding step S4.

After the first step of the welding, for example S1, the next step S2 is carried out in a region 9 of the plastic element which has already been exposed to specific loading by the first welding step S1 and is again in the relaxed state. Because of the surface structuring with grooves 21, the surface of the first and/or second component 31, 32 is increased so that the melting of the structure takes place better and more efficiently.

This means that less energy, stress and thermal influence need to be applied for the second welding step S2 than for S1, since the material has not yet fully cooled and resolidified. Because of the stepwise welding, less energy is introduced overall into the components to be welded, yet the welded connection is very strong. The strength of the connection is increased by from 9 to 13% compared with connection between components without a surface structure.

There must in this case be a certain time interval between the individual welding steps S1, S2, in order to give the material the opportunity to relax.

What is claimed is:

1. A method for producing a connection between a first component and a second component, comprising:

producing at least one of the first and second components by plastics injection moulding;

forming at least one fastening region on the first component, wherein the fastening region is moulded with a surface structure of grooves; and connecting the first and second components to one another by ultrasonic welding at the fastening region, wherein the grooves each have a triangular-shaped cross-section and each terminate at a groove apex, wherein a space between the apexes of adjacent grooves is between 0.1 mm and 2 mm, and wherein the grooves are arranged as elongated, parallel rows and are depressed into the fastening region.

2. The method according to claim 1, wherein energy for the step of ultrasonic welding is introduced into the first and second components via at least one pin of a sonotrode, and wherein the first and second components are spot-welded to one another step-by-step.

3. The method according to claim 2, wherein a next respective welding step is carried out in a region which has already been stressed by a previous step of the welding and relaxed again.

4. The method according to claim 1, wherein the first component is a bumper for a vehicle and the second component is a holder for a sensor for the vehicle.

5. The method according to claim 1 wherein the first component has a depth of 15 mm.

6. A method for producing a connection between a vehicle bumper and a sensor holder, comprising:

forming at least one fastening region on the vehicle bumper comprised of a plurality of grooves each having a triangular-shaped cross-section and each terminating at a groove apex, and wherein the grooves are arranged as elongated, parallel rows and are depressed in the fastening region surface;

wherein a space between the groove apex of adjacent grooves of the fastening region of the vehicle bumper is approximately 0.7 mm;

forming at least one fastening region on the sensor holder comprised of a plurality of grooves each having a triangular-shaped cross-section and each terminating at a groove apex, and wherein the grooves are arranged as elongated, parallel rows and are depressed in the fastening region surface;

wherein a space between the groove apex of adjacent grooves of the fastening region of the sensor holder is approximately 0.7 mm; and connecting the vehicle bumper and the sensor holder to one another by ultrasonic welding in the fastening regions of the vehicle bumper and sensor holder.

7. The method as set forth in claim 6, wherein a depth between the groove apex and a groove base of each of the grooves is approximately 0.6 mm.

8. The method as set forth in claim 6, wherein energy for the step of ultrasonic welding is introduced into the vehicle bumper and the sensor holder via at least one pin of a sonotrode, the bumper of the vehicle and the sensor holder being spot-welded to one another step-by-step.

9. The method according to claim 8, wherein a next respective welding step is carried out in a region which has already been stressed by a previous step of the welding and relaxed again.

10. The method as set forth in claim 6, wherein the bumper has a depth of 15 mm.

11. A method for producing a connection between a vehicle bumper and a sensor holder, comprising:

forming at least one fastening region on the vehicle bumper comprised of a plurality of grooves each having a triangular-shaped cross-section and each terminating at a groove apex, and wherein the grooves are arranged as elongated, parallel rows and are depressed in the fastening region surface;

wherein a space between the groove apex of adjacent grooves of the fastening region of the vehicle bumper is 0.7 mm;

forming at least one fastening region on the sensor holder comprised of a plurality of grooves each having a triangular-shaped cross-section and each terminating at a groove apex, and wherein the grooves are arranged as elongated, parallel rows and are depressed in the fastening region surface;

wherein a depth between the groove apex and a groove base of each of the grooves of the fastening regions of the vehicle bumper and the sensor holder is approximately 0.6 mm; and connecting the vehicle bumper and the sensor holder to one another by ultrasonic welding in the fastening regions of the vehicle bumper and sensor holder.

12. The method as set forth in claim 11, wherein a space between the groove apex of adjacent grooves of the fastening region of the sensor holder is approximately 0.7 mm.

13. The method as set forth in claim 11, wherein the bumper has a depth of 15 mm.

* * * * *